United States Patent [19]

Pine

[11] Patent Number: 4,465,780

[45] Date of Patent: Aug. 14, 1984

[54] PHOSPHORUS-CONTAINING CATALYST

[75] Inventor: Lloyd A. Pine, Baton Rouge, La.

[73] Assignee: Exxon Research & Engineering Co., Florham Park, N.J.

[21] Appl. No.: 434,201

[22] Filed: Oct. 14, 1982

[51] Int. Cl.$^3$ .................. B01J 29/08; B01J 21/16
[52] U.S. Cl. ................................. 502/68; 502/79
[58] Field of Search ............... 502/68, 79, 208; 208/114

[56] References Cited

U.S. PATENT DOCUMENTS

| Re. 28,629 | 11/1975 | Maher et al. | 423/112 |
|---|---|---|---|
| 3,375,065 | 3/1968 | McDaniel et al. | 23/112 |
| 3,595,611 | 7/1971 | McDaniel et al. | 23/111 |
| 3,663,165 | 5/1972 | Haden, Jr. et al. | 502/79 X |
| 3,676,368 | 7/1972 | Scherzer et al. | 252/455 Z |
| 3,781,199 | 12/1973 | Ward | 208/89 |
| 3,867,279 | 2/1975 | Young | 208/114 |
| 4,036,739 | 7/1977 | Ward | 208/120 |
| 4,048,284 | 8/1977 | Horton et al. | 423/112 |
| 4,179,358 | 12/1979 | Swift et al. | 208/114 |
| 4,325,813 | 4/1982 | Brown et al. | 208/120 |

FOREIGN PATENT DOCUMENTS 1524123 9/1978 United Kingdom .

*Primary Examiner*—Carl F. Dees
*Attorney, Agent, or Firm*—Marthe L. Gibbons

[57] ABSTRACT

A phosphorus-containing low alkali metal content zeolitic catalyst made from a clay starting material is provided. The catalyst is obtained by contacting a partially cation exchanged calcined zeolite-containing catalyst with an anion such as a dihydrogen phosphate anion or a dihydrogen phosphite anion and additionally with an ammonium salt other than a salt of an inorganic acid of phosphorus. A hydrocarbon catalytic cracking process utilizing the phosphorus-containing catalyst is also provided.

35 Claims, No Drawings

PHOSPHORUS-CONTAINING CATALYST

BACKGROUND OF THE INVENTION

1. Field of the Invention

The present invention relates to a phosphorus-containing catalyst prepared from a clay starting material and to a hydrocarbon catalytic cracking process utilizing the catalyst.

2. Description of the Prior Art

Catalytic cracking processes in which a hydrocarbonaceous oil is converted to lower boiling hydrocarbon products in the presence of cracking catalysts are well known. Catalysts comprising a zeolite and a silica-alumina residue made from a calcined clay starting material in which the zeolite is produced in the clay are known. See, for example, U.S. Pat. No.3,663,165, the entire content of which is hereby incorporated by specific reference.

It is also known to produce low alkali metal content zeolites by cation exchanging, followed by calcination at a temperature of 400° to 1500° F. followed by at least an additional ion exchange step. See, for example U.S. Pat. No. Re 28,629 which is a reissue of U.S. Pat. No. 3,402,996, the teachings of which are hereby incorporated by specific reference.

U.S. Pat. No. 4,325,813 discloses the preparation of a clay derived zeolitic catalyst using repeated contact with an ammonium salt solution to exchange readily exchangeable sodium ions followed by calcination and re-exchange with an ammonium salt to reduce further the alkali metal content. The catalyst contained 0.20 weight percent $Na_2O$ (see column 5, lines 41 to 51).

U.S. Pat. No. 4,048,284 discloses multistage ion exchanging of sodium on zeolite-containing microspheres.

British Pat. No. 1,524,123 discloses the preparation of a clay derived zeolite. The sodium content of the catalyst is reduced to less than about 1 weight percent by either of two exchange processes. In the second process, the product is exchanged twice with ammonium sulfate solution and once with rare earth metal salt solution.

U.S. Pat. No. 3,595,611 discloses reducing the sodium content of the zeolite via steps of ammonium exchange, then rare earth exchange, calcination and further ammonium exchange. Example 4 describes applying this ion exchange method to a faujasite prepared from calcined clay.

U.S. Pat. No. 3,375,065 discloses cation exchanging a zeolite by a sequence which comprises cation exchange with ammonium ions, followed by heat treatment at a temperature above 350° F., and further cation exchange with ammonium, followed by cation exchange with magnesium, rare earth and mixtures thereof.

U.S. Pat. No. 3,676,368 discloses a sequence of ion exchanging a zeolite with rare earth ions, calcination of the exchanged zeolite, and exchanging the calcined zeolite with ammonium ions. The final exchange may be conducted on the zeolite alone or on the zeolite incorporated in a conventional matrix.

U.S. Pat. No. 4,036,739 discloses hydrothermally stable and ammonia stable Y zeolite in which a sodium Y zeolite is ion exchanged to partially exchange sodium ions for ammonium ions, steam calcined and further ion exchanged with ammonium ions to reduce the final sodium oxide content to below 1 weight percent, and calcining the reexchanged product, or according to U.S. Pat. No. 3,781,199, the second calcination may be conducted after the zeolite is admixed with the refractory oxide.

It has now been found that a catalyst comprising a clay derived zeolite and phosphorus prepared by a specified method has increased activity for cracking hydrocarbonaceous feeds.

SUMMARY OF THE INVENTION

In accordance with the invention, there is provided a catalyst comprising a crystalline alumino-silicate zeolite prepared from a clay starting material, a residue derived from said clay, and an effective amount of phosphorus, said catalyst having been prepared by the steps which comprise: (a) ion exchanging a clay derived alkali metal-containing Y-type crystalline aluminosilicate zeolite and the clay derived residue with a cation of a non-alkali metal to decrease the alkali metal content of said alkali metal-containing zeolite; (b) calcining the resulting ion exchanged zeolite and clay derived residue, and (c) contacting the resulting calcined zeolite and clay derived residue with an anion selected from the group consisting of dihydrogen phosphate anion, dihydrogen phosphite anion and mixtures thereof and with at least one ammonium salt other than a salt of an inorganic acid of phosphorus for a time sufficient to composite an effective amount of phosphorus with said calcined zeolite and residue and to decrease additionally the alkali metal content of said zeolite.

In accordance with the invention there is also provided a hydrocarbon catalytic cracking process utilizing the above-stated catalyst.

DETAILED DESCRIPTION OF THE INVENTION

The catalyst of the present invention comprises a Y-type crystalline aluminosilicate zeolite derived from a clay starting material and the clay derived residue (e.g. silica-alumina) which remains associated with the zeolite when it crystallizes in the clay starting material. The catalyst comprises an effective amount of phosphorus to enhance the activity of the catalyst relative to the same catalyst without the incorporation of phosphorus by the specified method and a low alkali metal content. Suitable amounts of phosphorus present in the catalyst include from at least about 0.1 weight percent, preferably from at least about 0.2 weight percent, more preferably from about 0.5 to about 0.8 weight percent phosphorus, calculated as elemental metal, based on the weight of the zeolite plus clay derived residue. The required amount of phosphorus will in part depend on the zeolite content of the catalyst. Thus, for a catalyst comprising from about 15 to 20 weight percent zeolite, amounts of phosphorus ranging from about 0.2 to about 0.8 weight percent based on the weight of the zeolite plus clay residue will be desirable. Preferably, the catalyst comprises less than 1.5 weight percent alkali metal, more preferably less than 1 weight percent alkali metal, calculated as alkali metal oxide, based on the weight of the zeolite present in the catalyst. By "Y-type zeolite" is intended herein a crystalline aluminosilicate zeolite having the structure of faujasite and having a silica to alumina mole ratio of at least about 3:1. The catalyst of the present invention is characterized by its method of preparation to incorporate the phosphorus component. The Y-type crystalline alumino-silicate can be prepared by any known method of preparing a zeolite from clay and an additional source of silica to produce the high silica to alumina Y-type zeolite. The additional source of silica may be, for example, an alkali metal silicate salt or added exothermed kaolin or an aqueous silica sol. Known methods of preparation include use of reaction mixtures containing clay and sodium silicate and subsequent treatment with sodium hydroxide to form the zeolite; treatment of mixtures of exothermed kaolin and metakaolin with sodium hydroxide to form the zeolite. Zeolitic catalysts made from a clay starting material are commercially available. See, for example, *Chemical Week*, July 26, 1978, pages 42–44, in which Engelhard's in situ produced zeolitic catalysts made from a kaolin starting material are described. The commercially available zeolite-containing catalysts made from a clay starting material have usually been subjected to at least one conventional cation exchange step to reduce the alkali metal content generally to slightly below 1 weight percent, calculated as the alkali metal oxide, based on the total catalyst. After the conventional cation exchange step, as is known in the art, the catalyst may be subjected to a dry or wet (steam) calcination prior to its use. In accordance with the present invention, a catalyst comprising a Y-type zeolite prepared from a clay starting material, including the remaining clay derived residue, and which has been subjected to a first ion exchange with a hydrogen ion or hydrogen ion precursor to partially reduce the alkali metal content thereof is calcined at a temperature and for a time sufficient to decrease the unit cell size of the Y-type zeolite from its initial value of above about 24.5 angstroms, which value may be as high as 24.7 angstroms, to a lower unit cell size. For example, the difference between the initial unit cell size of the zeolite and the unit cell size of the zeolite resulting from the calcination may range from about 0.05 to about 0.10 angstroms. Suitable calcination temperatures range from about 500° F. to about 1400° F., preferably from about 600° F. to about 1200° F., in air (dry) or in the presence of steam. The calcined Y-type zeolite, including the clay derived residue, is contacted with an anion selected from the group consisting of a dihydrogen phosphate anion ($H_2PO_4^-$), a dihydrogen phosphite anion ($H_2PO_3^-$) and mixtures thereof and with at least one ammonium salt other than a salt of an inorganic acid of phosphorus for a time sufficient to composite phosphorus, with the catalyst and to decrease additionally the alkali metal content of the zeolite. The anion and ammonium salt other than a salt of an inorganic acid of phosphorus may be present in the same contacting medium so that the zeolite and residue are contacted simultaneously with the anion and ammonium salt or the anion and ammonium salt may be present in separate media to contact the zeolite plus residue sequentially. The sequence is not critical, that is, the anion contacting step may precede or follow the contact with the ammonium salt other than a salt of an inorganic acid of phosphorus. Suitable amounts of phosphorus to be incorporated in the catalyst include at least about 0.1 weight percent, preferably at least about 0.2 weight percent, more preferably from about 0.5 to 0.8 weight percent, calculated as elemental phosphorus, based on the weight of the zeolite plus whatever clay derived residue remains associated with the zeolite when it is prepared from clay. Preferably, the catalyst comprises less than 1.5 weight percent alkali metal, more preferably less than 1 weight percent alkali metal, calculated as alkali metal oxide, based on the weight of the zeolite present in the catalyst. The amount of phosphorus required to produce a catalyst having increased activity for the conversion of hydrocarbons will vary depending on the amount of zeolite present in a particular catalyst. The anion is derived from a phosphorus-containing component selected from the group consisting of inorganic acids of phosphorus, salts of inorganic acids of phosphorus, and mixtures thereof. Suitable phosphorus-containing components include phosphorous acid ($H_3PO_3$), phosphoric acid ($H_3PO_4$), salts of phosphorous acid, salts of phosphoric acid and mixtures thereof. Although any soluble salts of phosphorous acid and phosphoric acid, such as alkali metal salts and ammonium salts may be used to provide the dihydrogen phosphate or phosphite anion, it is preferable to use ammonium salts since the use of alkali metal salts would require subsequent removal of the alkali metal from the catalyst. Preferably, the anion is a dihydrogen phosphate anion derived from monoammonium phosphate, diammonium phosphate and mixtures thereof. The additional ammonium salts of an acid other than an inorganic acid of phosphorus, include ammonium sulfate, ammonium nitrate, ammonium nitrite, ammonium chloride, ammonium acetate, organic quaternary ammonium compounds and mixtures thereof. Contact with the anion and with the ammonium salt may be performed as at least one step of contacting or a series of contacts which may be a series of alternating calcinations and contacting steps. Contact of the anion-containing medium with the zeolite and clay derived residue is suitably conducted at a pH ranging from about 2 to about 8. The lower pH limit is selected to minimize loss of crystallinity of the zeolite. The upper pH limit appears to be set by the effect of the anion concentration. Suitable concentrations of the dihydrogen phosphate or dihydrogen phosphite anion in the liquid medium range from about 0.2 to about 10.0 weight percent anion. The lower limit is chosen to provide the desired lower limit of phosphorus in the catalyst. Although the upper limit is not critical, a concentration above the stated upper limit would not be necessary. The chosen concentration of the anion in the solution will also depend on the amount of solution used per weight of zeolite and clay residue being treated. Suitable mole ratio of the anion and the ammonium salt other than a salt of an acid of phosphorus when both are present in the same medium may range from about 0.05:1 to about 1:1. Treating time and temperatures are not critical and may range from about ambient temperature, that is, from 60° F. to about 250° F. If desired, the resulting phosphorus-containing clay derived Y-type zeolite and clay residue (e.g. predominantly, silica and alumina) may be composited with other components generally used in cracking catalysts, either as matrices, binders, catalytic components, inert components, such as clay; inorganic oxides such as silica; alumina; silica-alumina; zirconia; titania; magnesia; boria; etc. Alternatively, the clay derived zeolite and clay derived residue may be first composited with the additional catalytic components such as silica or silica-alumina and subsequently contacted with a dihydrogen phosphate anion or dihydrogen phosphite anion and with other ammonium salt. The anion and ammonium salt contacting step of the present invention may be carried out on any of the known catalysts in which the zeolite is derived from a clay starting material. Such catalysts generally comprise zeolite crystals in a matrix of silica-alumina residue of calcined kaolin clay. The preferred clay derived zeolite to produce the catalyst of the present invention is one made as described in U.S. Pat. No. 3,663,165.

One method of making a suitable catalyst is as follows: a zeolitic catalyst that was made by forming a zeolite in a preformed calcined kaolin clay and that has been cation exchanged with a non-alkali metal cation such as hydrogen ions, hydrogen ion precursors, e.g. ammonium ions and mixtures thereof, to reduce its alkali metal oxide content, to at least about 1.5 weight percent preferably to below 1.0 weight percent calculated as alkali metal oxide, based on zeolite and clay residue is calcined at a temperature between 600° and 1200° F., in a dry or wet atmosphere. The ion exchanged calcined catalyst is then contacted with a solution comprising an ammonium salt of a phosphoric acid such as monoammonium phosphate and an ammonium salt of an acid other than an acid of phosphorus, such as ammonium nitrate. The contacting step, which may be considered as second cation exchange, may be one stage of exchange or series of ion exchanges. If desired, after the final exchange step, the catalyst may be calcined again. Furthermore, if desired, the final composite catalyst may be contacted with a solution comprising rare earth metal components to incorporate rare earth metal components into the catalyst. The resulting catalyst may be used as such or it may be additionally composited with other catalyst components or binders.

The amount of zeolite present in the composite catalyst may range from about 2.0 to about 70 weight percent, preferably at least about 10 weight percent, more preferably above about 15 weight percent.

A preferred method of making a suitable catalyst for use in the process of the present invention is as follows: a catalyst in microspherical form is prepared by forming a suspension comprising: (a) microspheres comprising calcined kaolin clay which has undergone the kaolin exotherm, (b) an aqueous solution of an alkali metal hydroxide, for example, sodium hydroxide, and optionally, but preferably, also (c) powdered metakaolin; aging the suspension; subjecting the suspension to agitation, heating the suspension until a faujasite zeolite type crystals form in the microsphere (above about 15 percent, preferably above about 20 percent) and an alkali metal silicate (e.g. sodium silicate) mother liquor is formed, separating microspheres comprising crystalline alkali metal faujasite crystals from an aqueous phase of the suspension, decreasing the alkali metal content of the microspheres by ion exchange with a non-alkali metal cation to decrease the alkali metal content of the microspheres. The ion exchange may be conducted by contacting the microspheres with the solution containing hydrogen ion or hydrogen ion precursors such as, for example, ammonium ion, and mixtures thereof, in any conventional method known in the art. The exchanged microspheres are dried and may be calcined, dry or wet (steam) prior to use. Such a catalyst is described in U.S. Pat. No. 3,663,165. The term "faujasite" is used herein to designate zeolites having the structure of naturally occurring faujasite, of zeolite X (described in U.S. Pat. No. 2,882,244) and zeolite Y (described in U.S. Pat. No. 3,130,007). Preferably, a Y-type zeolite is formed in situ in the clay. In accordance with the present invention, the conventional first ion exchange step is carried out until the alkali metal content of the catalyst, calculated as alkali metal oxide, is not greater than about 1.5 weight percent, preferably below 1 weight percent to effect partial removal of the alkali metal. It should be noted that the given alkali metal oxide level after the first ion exchange is the preferred alkali metal level for catalysts comprising between 15 to 20 weight percent zeolite. For catalysts comprising other amounts of zeolite, a suitable alkali metal oxide level after the first ion exchange will range from about 2 to about 4 weight percent alkali metal oxide based on the weight of the zeolite alone. The ion exchanged catalyst is then calcined, preferably dry or in the presence of steam and at a temperature ranging from about 500° to about 1400° F., preferably from about 600° to about 1200° F. The calcined partially exchanged catalyst is then contacted with a solution comprising a dihydrogen phosphite anion or a dihydrogen phosphate anion, e.g. an ammonium salt of phosphoric acid, and an ammonium salt other than a salt of an inorganic acid of phosphorus until at least 0.1 weight percent phosphorus are associated with the catalyst (i.e. zeolite plus silica-alumina residue of the clay) and the catalyst comprises less than 1.5 weight percent alkali metal, calculated as alkali metal oxide, based on the weight of the zeolite present in the catalyst. The anion-containing medium contacting treatment after the first calcination may be performed as one stage of contact or as a series of anion contacting steps with or without alternating calcination. Suitable anion-containing contacting solution temperatures range from about 60° F. to about 250° F. After the final anion contacting step, the resulting catalyst may be calcined prior to use or in the catalytic cracking unit during use of the catalyst.

The catalyst of the present invention is suitable for catalytic cracking of hydrocarbonaceous oil feeds. Catalytic cracking with the catalyst of the present invention can be conducted in any of the conventional catalytic cracking manners utilizing conventional feeds well known for use in catalytic cracking processes which are conducted in the absence of added hydrogen. Suitable catalytic cracking conditions include a temperature ranging from about 750° to 1300° F., a pressure ranging from about 0 to 150 psig, preferably from about 0 to about 45 psig. The catalytic cracking process may be carried out as a fixed bed, moving bed, ebullated bed, slurry, transferline (dispersed phase) or fluidized bed operation. The catalyst of the present invention is especially suited for use in the fluidized bed and transferline catalytic cracking processes. The catalyst may be regenerated at conditions which include a temperature in the range of about 1100° F. to about 1500° F., preferably from about 1175° F. to about 1350° F.

Suitable feeds for the catalytic cracking processes of the present invention are hydrocarbonaceous oils ranging from a naphtha boiling range to heavy hydrocarbonaceous oils boiling above about 650° F. at atmospheric pressure, including residua.

The hydrocarbonaceous oils may be derived from any source such as petroleum; liquids derived from coal liquefaction processes, including coal liquefaction bottoms; shale oils; tarsand oils, etc. The catalyst is particularly suited for cracking hydrocarbon mixtures having an atmospheric pressure boiling point ranging from an initial boiling point from about 450° F. or 650° F. to a final boiling point of about 1050° F., such as gas oils.

PREFERRED EMBODIMENTS

The following examples are presented to illustrate the invention.

EXAMPLE 1

A catalyst, designated herein "Catalyst A", was a commercially available catalyst made from a calcined kaolin clay starting material and comprising at least about 15 weight percent of a Y-type zeolite in a matrix comprising a silica-alumina residue of caustic leached exothermed kaolin clay. Catalyst A was used as starting material to prepare catalysts B and C. Catalyst B was prepared by first calcining 40 lbs of catalyst A for 6 hours at 538° C. in air. The calcined catalyst was then ion exchanged twice. Each exchange was performed with with 300 pounds of 10 weight percent ammonium sulfate solution for 3 hours at 65° C. The exchanged catalyst was washed with hot water to remove excess ammonium sulfate and then dried. The treated catalyst was divided into two equal portions. One portion was labeled catalyst B and the other portion was further treated to prepare catalyst C. Conversion to catalyst C was accomplished by stirring the remaining portion of ion exchanged catalyst in a solution made by dissolving 2.0 pounds of monoammonium phosphate in 150 pounds of water. Stirring was continued for 3 hours at room temperature. After filtering and washing with hot water, the product was dried and designated "Catalyst C".

Catalysts A, B and C were then deactivated by steaming for 16 hours at 760° C. under one atmosphere of pressure. This deactivation was performed to simulate the changes in a catalyst caused by exposure to commercial unit operating conditions. The analytical inspections on the steamed catalysts are given in Table I.

TABLE I

| Catalyst | A | B | C |
|---|---|---|---|
| BET[1] Surface Area, m$^2$/g | 209 | 231 | 241 |
| BET[1] Pore Volume, cc/g | .42 | .42 | .40 |
| Bulk Density, g/cc | .76 | .79 | .81 |
| Chemical Analysis, Wt. % | | | |
| Al$_2$O$_3$ | 58.0 | 58.8 | 55.3 |
| Na$_2$O | 0.81 | .04 | .03 |
| P | — | — | .44 |
| MAT, Microactivity Test[2] Conversion, LV % | 63.8 | 64.7 | 67.4 |

[1]BET = method of Brunauer, Emmett and Teller, J. American Chem. Soc., Vol. 60 (1938), pp. 309–319.
[2]Microactivity Test - See Oil & Gas Journal, 1966, Vol. 64, p. 7, 84 and 85 and Nov. 22, 1971, pp. 60–68.

Catalyst C, which was a catalyst in accordance with the present invention, had the highest activity as measured by the microactivity test (MAT).

EXAMPLE 2

Each of the three catalysts, (A, B, C) was evaluated in a small fully integrated circulating pilot plant with a fluid bed reactor. The run conditions included a pressure of 1 atmosphere, a reactor temperature of 496° C. and a regenerator temperature of 604° C. Duplicate runs were made at each of three conversion levels. Conversion was changed by varying both feed rate and catalyst circulation rate in order to maintain a constant catalyst to oil weight ratio of 4.0. Product yields and qualities were plotted against conversion. The data in Table II were taken from those points at 65 volume percent conversion to product boiling at or below 221° C. The feed to the pilot plant was a raw vacuum gas oil boiling in the range of 330° to 556° C.

TABLE II

| PRODUCT YIELDS AND QUALITIES AT 65 VOL. % CONVERSION TO 221° C.⁻ | | | |
|---|---|---|---|
| Catalyst | A | B | C |
| Coke, wt. % | 3.3 | 3.4 | 3.0 |
| C$_3$-Gas, wt. % | 3.8 | 6.0 | 5.5 |
| C$_5$-221° C. Naphtha, Vol. % | 62.0 | 57.1 | 57.1 |

TABLE II-continued

| PRODUCT YIELDS AND QUALITIES AT 65 VOL. % CONVERSION TO 221° C.⁻ | | | |
|---|---|---|---|
| Catalyst | A | B | C |
| RON Clear[1] | 90.4 | 94.3 | 93.6 |
| MON Clear[2] | 78.8 | 80.5 | 80.5 |

[1]Research Octane Number Clear
[2]Motor Octane Number Clear

As can be seen from the data in Table II, catalyst C, which was a catalyst in accordance with the present invention, produced a naphtha with an octane number about as high as that obtained with catalyst B but was a more active catalyst than either catalyst A or catalyst B.

What is claimed is:

1. A catalyst comprising a crystalline alumino-silicate zeolite prepared from a clay starting material, a residue derived from said clay, and an effective amount of phosphorus, said catalyst having been prepared by the steps which comprise:
   (a) ion exchanging a clay derived alkali metal-containing Y-type crystalline aluminosilicate zeolite and the clay derived residue with a cation other than an alkali metal to decrease the alkali metal content of said alkali metal-containing zeolite;
   (b) calcining the resulting ion exchanged zeolite and clay derived residue, and
   (c) contacting the resulting calcined zeolite and clay derived residue with an anion selected from the group consisting of a dihydrogen phosphate anion, a dihydrogen phosphite anion and mixtures thereof and with at least one ammonium salt other than a salt of an inorganic acid of phosphorus for a time sufficient to composite said effective amount of phosphorus with said calcined zeolite and residue and to decrease additionally the alkali metal content of said zeolite.

2. The catalyst of claim 1, wherein said anion and said ammonium salt of step (c) are present in the same medium and wherein said calcined zeolite and clay-derived residue are contacted simultaneously with said anion and said ammonium salt.

3. The catalyst of claim 1 wherein said calcined zeolite and clay-derived residue in step (c) are contacted separately with said anion and with said ammonium salt.

4. The catalyst of claim 1 wherein said catalyst additionally comprises clay.

5. The catalyst of claim 1 or claim 2 wherein said catalyst additionally comprises an inorganic oxide selected from the group consisting of silica, alumina, silica-alumina, zirconia, boria, titania, magnesia and mixtures thereof.

6. The catalyst of claim 1 wherein said catalyst comprises at least about 0.1 weight percent of said phosphorus, based on the weight of said zeolite plus residue.

7. The catalyst of claim 1 wherein said catalyst comprises at least about 0.2 weight percent of said phosphorus, based on the weight of said zeolite plus residue.

8. The catalyst of claim 1 wherein said catalyst comprises less than about 1.5 weight percent alkali metal, calculated as alkali metal oxide, based on the weight of said zeolite.

9. The catalyst of claim 1 wherein said catalyst comprises from about 2 to about 70 weight percent of said zeolite.

10. The catalyst of claim 1 wherein said calcination is conducted at conditions such as to decrease the unit cell size of said zeolite by an amount ranging from about 0.05 to 0.10 angstroms from its initial unit cell size of about above 24.5 angstroms.

11. The catalyst of claim 1 wherein said calcination is conducted at a temperature ranging from about 500° F. to about 1400° F.

12. The catalyst of claim 1 wherein said anion is derived from a phosphorus-containing component selected from the group consisting of inorganic acids of phosphorus, salts of an inorganic acid of phosphorus and mixtures thereof.

13. The catalyst of claim 12 wherein said anion is derived from a phosphorus-containing component selected from the group consisting of phosphorus acid ($H_3PO_3$), phosphoric acid ($H_3PO_4$), salts of phosphorous acid, salts of phosphoric acid and mixtures thereof.

14. The catalyst of claim 1 wherein said contacting step with said anion is conducted at a pH ranging from 2 to 8.

15. The catalyst of claim 1 wherein said anion of step (c) is present in a medium in an amount ranging from about 0.2 to about 10 weight percent.

16. In the process of preparing a Y-type crystalline aluminosilicate zeolite from a clay starting material and an additional source of silica and wherein an alkali metal-containing crystalline aluminosilicate zeolite derived from clay and a clay derived residue are ion exchanged with a cation other than an alkali metal to decrease the alkali metal content of said zeolite and the ion exchanged zeolite the clay derived residue are calcined, the improvement which comprises contacting the calcined ion exchanged zeolite and residue with an anion selected from the group consisting of dihydrogen phosphite anion, dihydrogen phosphate anion and mixtures thereof and with at least one ammonium salt other than a salt of an inorganic acid of phosphorus, to composite at least a portion of phosphorus with said zeolite and residue and to decrease additionally the alkali metal content of said zeolite.

17. The process of preparation of claim 16 wherein said anion and said ammonium salt of step (c) are present in the same medium.

18. The process of preparation of claim 16 wherein said calcined zeolite and clay residue in step (c) are contacted separately with said anion and with said ammonium salt.

19. The process of preparation of claim 16 wherein said contacting step with said anion is conducted for a time sufficient to composite at least about 0.1 weight percent phosphorus with said zeolite and residue.

20. The process of preparation of claim 16 wherein said contacting step with said anion is conducted for a time sufficient to composite at least about 0.2 weight percent phosphorus with said zeolite and residua.

21. The process of preparation of claim 16 wherein said catalyst comprises less than about 1.5 weight percent alkali metal, calculated as alkali metal oxide, based on the weight of said zeolite.

22. The process of preparation of claim 16 wherein said anion is derived from a phosphorus-containing component selected from the group consisting of inorganic acids of phosphorus, salts of inorganic acids of phosphorus and mixtures thereof.

23. The process of preparation of claim 16 wherein said anion is derived from a phosphorus-containing component selected from the group consisting of phosphoric acid, salts of phosphoric acid, phosphorous acid, salts of phosphorous acid and mixtures thereof.

24. The process of preparation of claim 16 wherein said anion is a dihydrogen phosphate anion derived from monoammonium phosphate, diammonium phosphate and mixtures thereof.

25. The process of preparation of claim 16 wherein said ammonium salt other than a salt of an inorganic acid of phosphorus is selected from the group consisting of ammonium sulfate, ammonium nitrate, ammonium nitrite, ammonium chloride, ammonium acetate, organic quaternary ammonium compounds and mixtures thereof.

26. The process of preparation of claim 16 wherein said contacting step with said anion is conducted at pH ranging from about 2 to about 8.

27. The process of preparation of claim 16 wherein said anion is present in a medium in an amount ranging from about 0.2 to about 10 weight percent.

28. The preparation process of claim 16 wherein said cation other than an alkali metal cation is selected from the group consisting of hydrogen, hydrogen ion precursors and mixtures thereof.

29. The process of preparation of claim 16 wherein said calcination is conducted at conditions such as to decrease the unit cell size of said zeolite by an amount ranging from about 0.05 to 0.10 angstroms from its initial unit cell size of above about 24.5 angstroms.

30. The process of preparation of claim 16 wherein said calcination is conducted at a temperature ranging from about 500° F. to about 1400° F.

31. The process of preparation of claim 16 wherein said source of additional silica is selected from the group consisting of alkali metal silicate, exothermed, kaolin, aqueous silica sol and mixtures thereof.

32. The process of preparation of claim 16 wherein said clay starting material is a calcined clay which has undergone the kaolin exotherm.

33. The process of preparation of claim 16 wherein said Y-type crystalline aluminosilicate is prepared by the steps which comprise: reacting particles comprising: (1) calcined kaolin clay which has undergone the kaolin exotherm; (2) powdered metakaolin and (3) a sodium hydroxide solution until a sodium form crystalline aluminosilicate Y-type zeolite crystallite is in said particles and a sodium silicate mother liquor is produced, separating from said mother liquor the resulting particles comprising the sodium Y-type crystalline aluminosilicate crystals and a silica-alumina residue of the calcined kaolin clay, decreasing the sodium content of said particles by ion exchange with a cation other than an alkali metal cation, calcining the resulting exchanged particles, the improvement which comprises contacting the calcined ion exchanged particles with an anion selected from the group consisting of dihydrogen phosphite anion, a dihydrogen phosphate anion and mixtures thereof and with at least one ammonium salt other than a salt of an inorganic acid of phosphorus, to composite with said particles at least a portion of phosphorus, and decrease additionally the alkali metal content of said zeolite, and recovering particles having increased catalytic activity.

34. The process of preparation of claim 33 wherein said particles are microspheres.

35. The catalyst of claim 1 wherein said catalyst comprises from about 0.1 weight percent to about 0.8 weight percent of said phosphorus, based on the weight of said zeolite plus residue.

* * * * *